US008850189B2

(12) United States Patent
Sie et al.

(10) Patent No.: US 8,850,189 B2
(45) Date of Patent: *Sep. 30, 2014

(54) EXTENDED DATA SIGNING (71) Applicant: Microsoft Corporation, Redmond, WA (US)

(72) Inventors: Yu Lin Sie, Bellevue, WA (US); Kedarnath A. Dubhashi, Redmond, WA (US); Anand D. Paka, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,398

(22) Filed: Dec. 21, 2012

(65) Prior Publication Data

US 2013/0111206 A1 May 2, 2013

Related U.S. Application Data (63) Continuation of application No. 12/137,513, filed on Jun. 11, 2008, now Pat. No. 8,370,625.

(51) Int. Cl.
*H04L 29/06* (2006.01)
*H04L 9/32* (2006.01)
(52) U.S. Cl.
CPC .......... *H04L 63/0823* (2013.01); *H04L 9/3263* (2013.01); *H04L 2209/603* (2013.01)
USPC .................................................... 713/156
(58) Field of Classification Search
USPC .................................................... 713/156
See application file for complete search history.

(56) References Cited

U.S. PATENT DOCUMENTS

| 6,219,423 | B1 * | 4/2001 | Davis ........................ 380/268 |
| 6,539,093 | B1 | 3/2003 | Asad |
| 6,854,056 | B1 | 2/2005 | Benantar |
| 6,898,707 | B1 | 5/2005 | Sit |
| 7,069,440 | B2 | 6/2006 | Aull |

(Continued)

FOREIGN PATENT DOCUMENTS

| EP | 0869637 | 12/2000 |
| WO | WO-2006006124 | 1/2006 |

OTHER PUBLICATIONS

"Final Office Action", U.S. Appl. No. 12/137,513, (Mar. 9, 2012), 15 pages.

(Continued)

*Primary Examiner* — Kambiz Zand
*Assistant Examiner* — Stephen Sanders
(74) *Attorney, Agent, or Firm* — Micah Goldsmith; Glen Johnson; Micky Minhas (57) ABSTRACT Various embodiments enable so-called extended data to be added to a signed digital certificate without having a private key of a Certification Authority available. In at least some embodiments, a request to add extended data to a digital certificate generated by a certificate authority is received from a client device. The digital certificate includes a signed first portion, and an unsigned second portion that includes reserved empty spaces that are reserved for the extended data. The extended data is added to the unsigned second portion. the extended data includes a client ID associated with the client device. The unsigned portion of the digital certificate is signed after the extended data is added.

20 Claims, 4 Drawing Sheets

(56) References Cited

U.S. PATENT DOCUMENTS

| | | | |
|---|---|---|---|
| 7,225,337 | B2 | 5/2007 | Baessler |
| 8,370,625 | B2 | 2/2013 | Sie |
| 2002/0116610 | A1 | 8/2002 | Holmes |
| 2003/0126432 | A1 | 7/2003 | Tonisson |
| 2006/0294366 | A1* | 12/2006 | Nadalin et al. ............ 713/156 |
| 2009/0310789 | A1 | 12/2009 | Sie |

OTHER PUBLICATIONS

"Final Office Action", U.S. Appl. No. 12/137,513, (Jun. 10, 2011), 11 pages.

"Non Final Office Action", U.S. Appl. No. 12/137,513, (Feb. 18, 2011), 10 Pages.

"Non-Final Office Action", U.S. Appl. No. 12/137,513, (Sep. 20, 2011), 13 pages.

"Notice of Allowance", U.S. Appl. No. 12/137,513, (Oct. 1, 2012), 7 pages.

"Understanding Digital Certificates", Retrieved from http://publib.boulder.ibm.com/iseries/v5r1/ic2924/index.htm?info/rzahu/rzahurzahu4abunderstandddc.htm on Mar. 14, 2008., 3 Pages.

Gladman, Brian Retrieved from: "Digital Signatures, Certificates and Electronic Commerce", <http://66.102.1.104/scholar?hl=en&lr=&q=cache:Jqhk353aH9QJ:sunsite.rediris.es/sites/ftp.cert.dfn.de/pub/dfnpca/docs/misc/digsig.pdf> on Mar. 14, 2008., (Jun. 1999), 19 Pages.

\* cited by examiner

EXTENDED DATA SIGNING

RELATED APPLICATIONS

This application is a continuation of, and claims priority to, U.S. patent application Ser. No. 12/137,513, filed on Jun. 11, 2008, the entire disclosure of which is incorporated by reference herein.

BACKGROUND

Public-key infrastructure or "PM" refers to a system that is utilized to provide public-key encryption and digital signature services. The purpose of PKI is to manage keys and certificates. By managing keys and certificates through a PKI, an organization can establish and maintain a trustworthy networking environment. PKIs can enable the use of encryption and digital signature services across a wide variety of applications.

PKIs can be used to ensure that user identities and keys are valid and trustworthy. To provide this assurance, all users of a PKI have a registered identity. These identities are stored in a digital format known as a public-key certificate. Certification Authorities (CAs) act as agents of trust in a PKI. As long as a CA is trusted, users can trust certificates issued by the CA. Certification Authorities create certificates for users or clients by digitally signing, with a CA private key, a set of data that can include the following information, as well as other information: an ID such as a client's hardware ID, a public key associated with the user or client, a validity period of the certificate, and/or specific operations for which the public key is to be used.

The Certification Authority's signature on a certificate allows any tampering with the contents of the certificate to be easily detected. As long as the Certification Authority's signature on a certificate can be verified, the certificate has integrity. Since the integrity of the certificate can be determined by verifying the Certification Authority's signature, certificates are inherently secure and can be distributed in a completely public manner.

In many systems, servers distribute certificates including the ID, public key, and signature. The certificate can, in some instances, be generated at run time responsive to a client request. Typically, a client will formulate a request and include, in the request, an ID that it wishes to be placed into the certificate. The certificate can then be generated, in at least some instances, by what is known as an individualization server.

One of the issues associated with servers issuing certificates, such as individualization servers, is that the servers are front-end servers that are operated by entities that are different from entities associated with digital rights management (DRM) entities that protect content that can be obtained and consumed using the issued certificates. If the individualization server's private key is compromised, as by being leaked by personnel associated with the individualization server, then certificates can be issued by malicious entities, thus compromising the integrity of the system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate.

In this manner, the certificate can be generated in two phases—a first phase can generate certificate portions prior to run time, and a second phase can generate other certificate portions at run time. The generated certificate can be cryptographically verified as with a normal digital certificate.

BRIEF DESCRIPTION OF THE DRAWINGS

The same numbers are used throughout the drawings to reference like features.

DETAILED DESCRIPTION

Overview

In at least some embodiments, two different keys can be utilized to assert information in a digital certificate. For example, a Certification Authority's key can assert first portions of the certificate, and another key can be used to assert other information in an extended portion of the certificate.

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate. In at least some embodiments, the extended data can be verified by ensuring that the signature on the extended data is by the extended data signing public key in the certificate.

In this manner, the certificate can be generated in two phases—a first phase can generate certificate portions prior to run time, and a second phase can generate other certificate portions at run time. The generated certificate can be cryptographically verified as with a normal digital certificate.

In the discussion that follows, a section entitled "Operating Environment" describes but one operating environment that can be utilized to practice the inventive principles described herein in accordance with one or more embodiments. Following this, a section entitled "Using Different Keys to Assert Information in a Digital Certificate" is provided and describes how different keys can be used to assert information in a digital certificate. Following this, a section entitled "Example Method" describes an example method in accordance with one or more embodiments. Last, a section entitled "Example System" describes an example system that can be utilized to implement one or more embodiments.

Operating Environment

Figure 1:
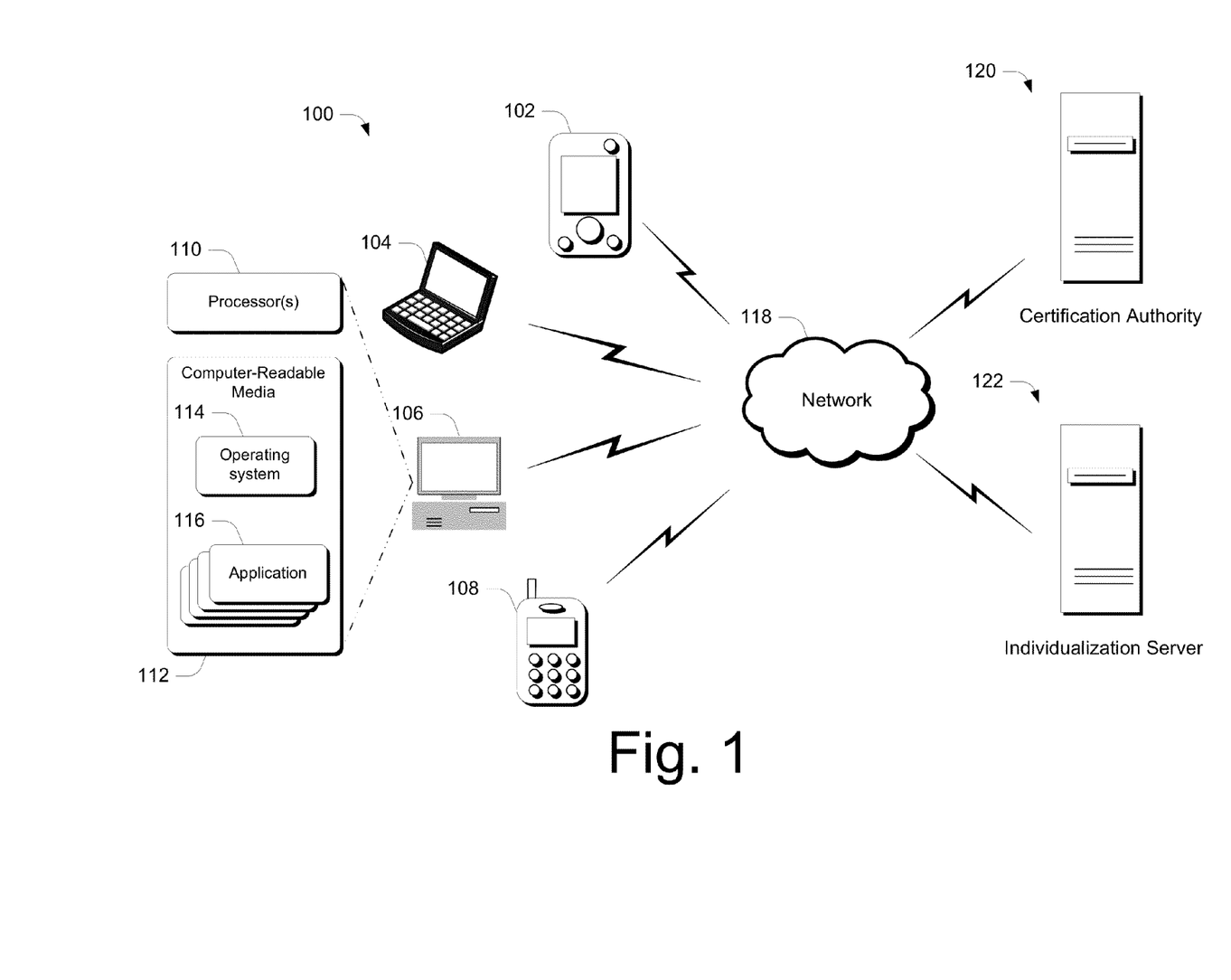
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used by a user to request certificates as will become apparent below. Individual computing devices can typically include one or more processors 110, one or more computer-readable media 112, an operating system 114 and one or more applications 116 that reside on the computer-readable media and which are executable by the processor(s). Such applications can include, by way of example and not limitation, a media playing application or any other type of application that can enable distributed content to be consumed by a user.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet, via which certificates can be requested and sent.

Operating environment 100 also includes, in at least some embodiments, a Certification Authority 120 in the form of a server, and an individualization server 122.

Certification Authority 120 maintains a private key of a public/private key pair, which is protected and secure, and which is used to sign certificates that are issued by the Certification Authority. For example, in at least some embodiments, the Certification Authority can issue a certificate that includes first and second portions. The Certification Authority's private key can be used to sign the first portion of the certificate. The individualization server 122 can maintain a private key of a public/private key pair which is used to sign the second portion of the certificate issued by the Certification Authority, as will become apparent below. In one or more embodiments, the certificate's second portion can be used for including extended data that can be added to the certificate after it has been signed by the Certification Authority's private key. Any suitable data can be included in the extended data including, by way of example and not limitation, an ID associated with a user or a client device. In this way, two different keys can be utilized to assert information that is contained in the certificate.

The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like. One example of a computing device is shown and described below in relation to FIG. 4.

Having discussed the general notion of an example operating environment in which various embodiments can operate, consider now a discussion of how different keys can be utilized to assert information in a digital certificate.

Using Different Keys to Assert Information in a Digital Certificate

Figure 2:
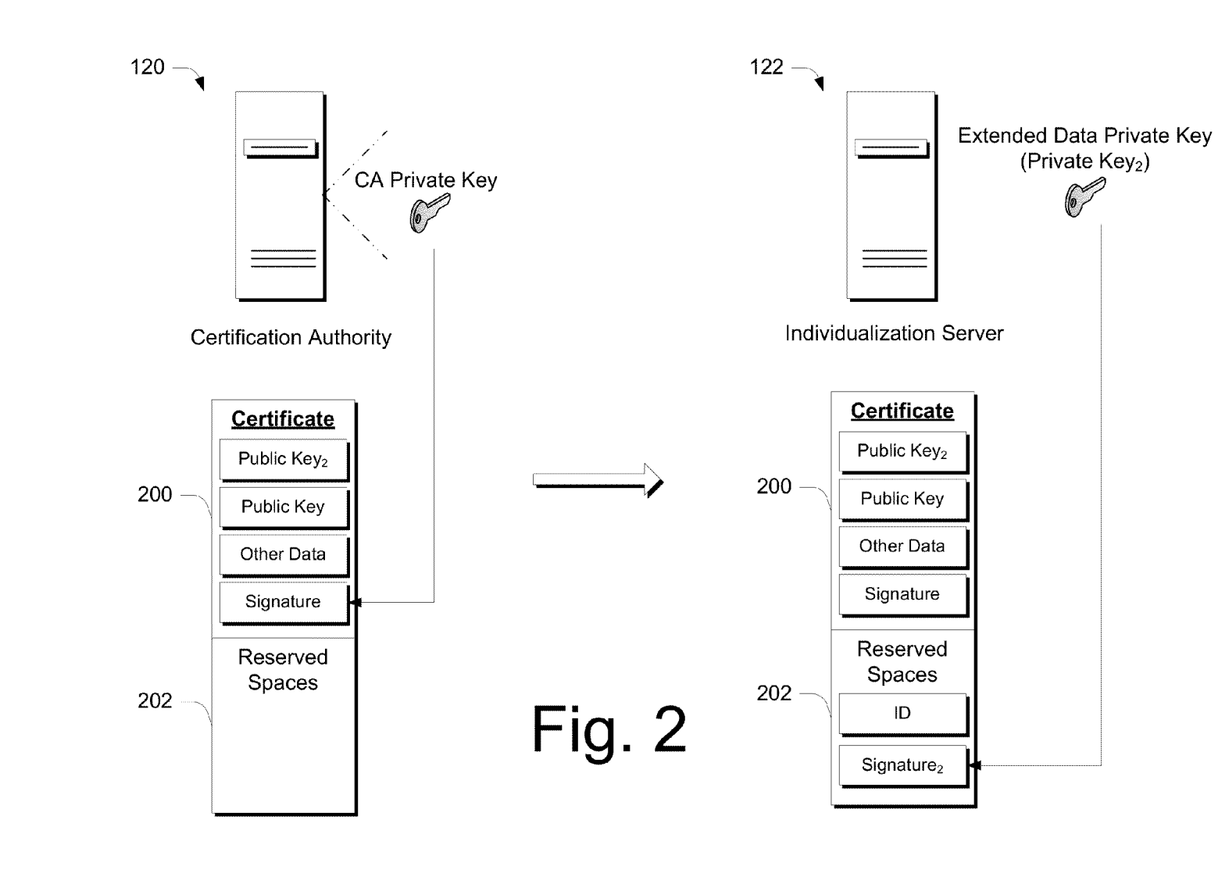
FIG. 2 illustrates a Certification Authority and an individualization server in accordance with one or more embodiments.

FIG. 2 illustrates Certification Authority 120 and individualization server 122 in accordance with one or more embodiments.

In the illustrated and described embodiment, the Certification Authority 120 maintains a secure private key, referred to in the figure as the "CA Private Key". The Certification Authority's private key is utilized to generate a certificate, also referred to herein as a data structure, as will be appreciated by the skilled artisan. In one or more embodiments, certificates generated by the Certification Authority can include a first portion 200 and a second portion 202. The first portion 200 can, in at least some embodiments, include a public key (designated "Public Key$_2$"), a public key associated with a client or user (designated "Public Key"), other data such as that mentioned above, and a signature, provided by the CA private key, over the certificate's first portion. In the illustrated and described embodiment, the Public Key$_2$ corresponds to the public key of an extended data signing key pair whose private key is maintained by individualization server 122 (designated "Private Key$_2$"). The second portion 202 can include reserved spaces that can be used for adding extended data to the certificate after the certificate has been signed by the CA private key. In the illustrated and described embodiment, second portion 202 is not signed by the CA private key, but is rather, as described below, signed by the private key corresponding to "Public Key$_2$" and hence is designated "Signature$_2$".

In at least some embodiments, the certificate is generated off line which can include scenarios in which a client device has not requested a certificate. That is, in at least some embodiments, the certificate is generated in advance of a client's request for a certificate. Once generated, the certificate can be provided to individualization server 122. The individualization server can maintain a collection of pre-generated certificates that have been signed by the CA private key.

The individualization server 122 can be used to add extended data to the certificate using second portion 202. The extended data can be added at any suitable time. For example, in at least some embodiments, the extended data can be added at run time and, in response to a request from a client device for a certificate. Any suitable type of extended data can be added to the certificate. In at least some embodiments, the extended data can include an ID, such as a hardware ID associated with the client device. Once the extended data has been added to the certificate, the second portion 202 can be signed using the private key (i.e., "Private Key$_2$") of the extended data signing key pair.

Having discussed an example Certification Authority and Individualization Server in accordance with one or more embodiments, consider now a discussion of an example method in accordance with one or more embodiments.

Example Method

Figure 3:
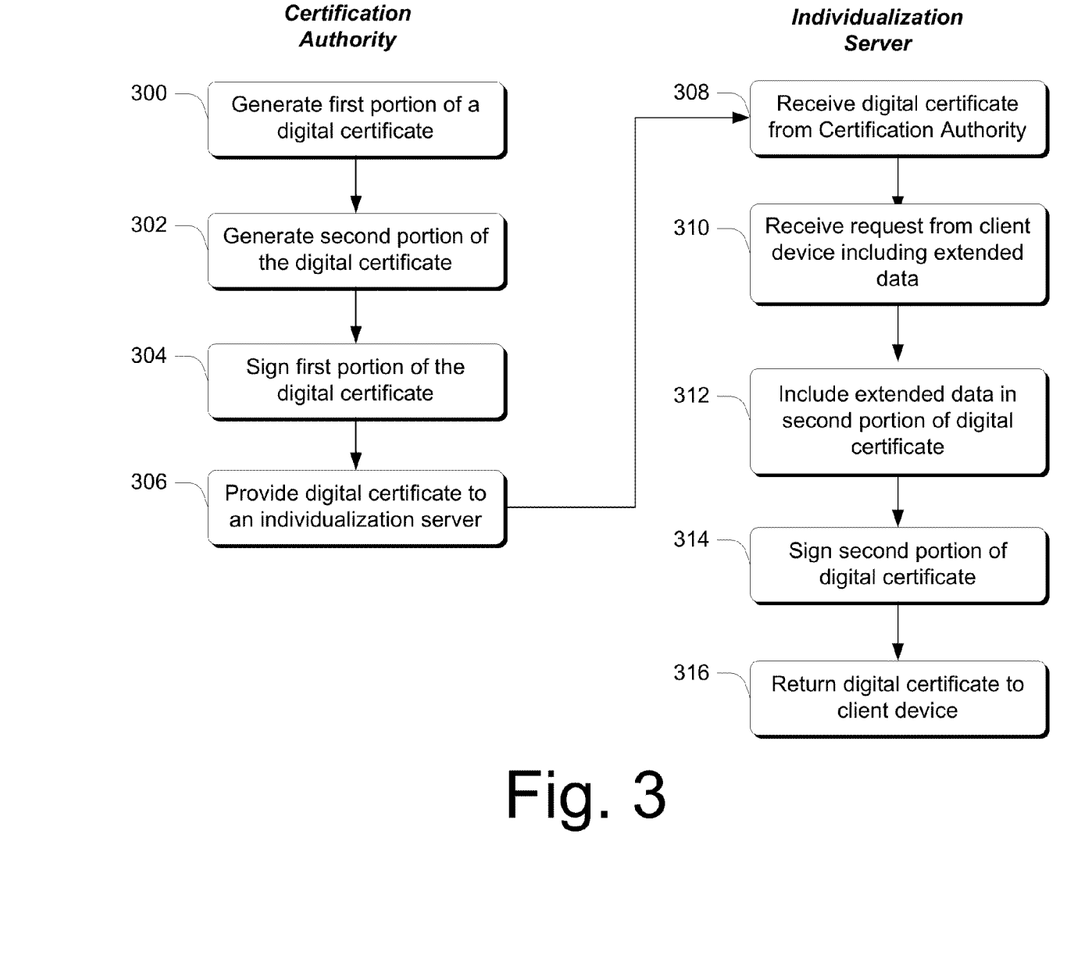
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, aspects of the method can be performed by a Certification Authority, and other aspects of the method can be performed by a suitably-configured server, such as an individualization server. As such, various acts are designated "Certification Authority" to indicate acts that are performed by a Certification Authority. Likewise, various other acts are designated "Individualization Server" to indicate acts that are performed by an individualization server. In at least some embodiments, the Certification Authority is a secure entity that resides in a physically-secure environment without Internet access. The Individualization Server, on the other hand, can be a front end server that is accessible via the Internet.

Step 300 generates a first portion of a digital certificate. The first portion can include a public key of an associated extended data signing key pair. The first portion can also include other types of information such as, by way of example and not limitation, a public key associated with a user or device, as well as other data that can typically be included in a certificate. Step 302 generates a second portion of the digital certificate. The second portion can include reserved spaces that are reserved for extended data that is to be provided after the first portion of the certificate is signed. Step 304 signs the first portion of the digital certificate. This step can be performed in any suitable way. For example, in at least some embodiments, the first portion of the digital certificate can be signed with a private key associated with the Certification Authority. Step 306 provides the digital certificate to a server such as an individualization server.

Step 308 receives the digital certificate from the Certification Authority. Step 310 receives a request from a client device including extended data. Any suitable type of extended data can be included in the request that is received from the client device. For example, in at least some embodiments, the extended data in the request can include an ID, such as a hardware ID associated with the client device. Step 312 includes the extended data in the second portion of the digital certificate. Step 314 signs the second portion of the digital certificate. This step can be performed in any suitable way. For example, in at least some embodiments, the individualization server can sign the second portion of the digital certificate using a private key of the extended data signing key pair. The private key of the extended data signing key pair is associated with and corresponds to the public key of the extended data signing key pair that was provided into the first portion of the digital certificate. Step 316 returns the digital certificate to the client device.

Accordingly, two different keys can be utilized to assert information in a digital certificate. Specifically, the Certification Authority's private key can assert first portions of the certificate, and the private key of the extended data signing key pair can be used to assert other information in an extended portion of the certificate. Thus, extended data can be added to a signed digital certificate without having a private key of a Certification Authority available. The digital certificate can be issued and signed off line by the Certification Authority, and then later extended data can be added and signed using the private key of the extended data signing key pair, whose corresponding public key was earlier embedded in the certificate.

Having discussed the notion of using different keys to assert information in a digital certificate, consider now a discussion of an example system that can be utilized to implement one or more embodiments.

Example System

Figure 4:
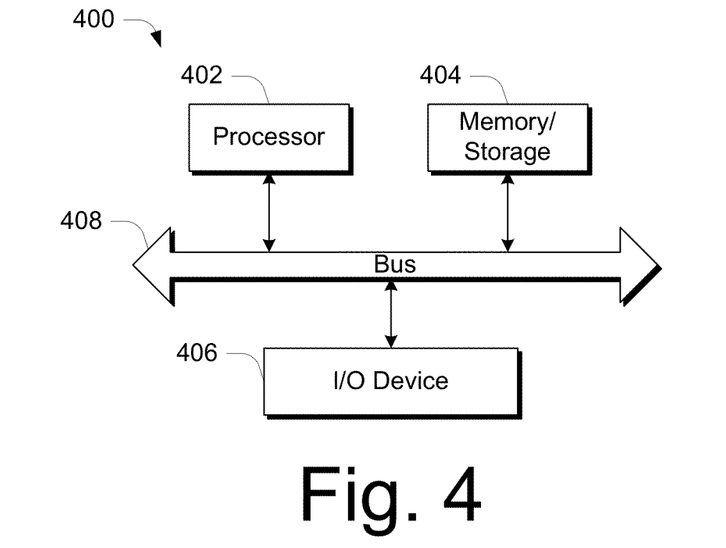
FIG. 4 is a block diagram of an example system that can be utilized to implement one or more embodiments.

FIG. 4 illustrates an example computing device 400 that can implement the various embodiments described above. Computing device 400 can be, for example, various computing devices or servers, such as those illustrated in FIG. 1 or any other suitable computing device.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate.

In this manner, the certificate can be generated in two phases—a first phase can generate certificate portions prior to run time, and a second phase can generate other certificate portions at run time. The generated certificate can be cryptographically verified as with a normal digital certificate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more computer-readable storage media embodying computer-readable instructions; and
   a processor configured to utilize the computer-readable instructions to cause the computing device to implement a method comprising:
      receiving a request from a client device to add extended data to a single digital certificate generated by a certificate authority, the single digital certificate including a signed first portion and an unsigned second portion, the unsigned second portion of the digital certificate including reserved empty spaces that are reserved for the extended data, the single digital certificate including a public key of an extended data signing key pair associated with the computing device that is to subsequently sign the single digital certificate, the public key being embedded in the signed first portion by the certificate authority when the single digital certificate is generated;
      responsive to receiving the request to add the extended data to the digital certificate, adding the extended data to the unsigned second portion of the digital certificate, the extended data including a client ID associated with the client device; and
      after adding the extended data to the unsigned portion of the digital certificate, signing, by the computing device, the unsigned portion of the digital certificate using a private key that corresponds to the public key of the extended data signing key pair.

2. A computing device as recited in claim 1, wherein the processor is configured to utilize the instructions to further cause the computing device to send the single digital certificate to the client device from which the request was received.

3. A computing device as recited in claim 1, wherein said signing is performed without having a key used to sign the first portion available.

4. A computing device as recited in claim 1, wherein said adding and signing are performed responsive to receiving a run time request.

5. A computing device as recited in claim 1, wherein the public key is usable to verify the extended data that is to be provided into the unsigned second portion.

6. One or more computer-readable hardware storage media comprising instructions that, when executed by a computing device, cause the computing device to implement a certificate authority, the certificate authority configured to:
   generate a single digital certificate that includes a first portion and a second portion by at least:
      generating the first portion of the digital certificate prior to run time; and
      generating the second portion of the digital certificate at run time, the second portion including reserved spaces that are reserved for extended data that is to be added and signed by an entity other than the certificate authority after the first portion of the digital certificate is signed.

7. One or more computer-readable hardware storage media as recited in claim 6, wherein said generating the first portion comprises including a public key of an associated extended data signing key pair.

8. One or more computer-readable hardware storage media as recited in claim 6, wherein the certificate authority is further configured to sign the first portion of the digital certificate using a private key associated with the certificate authority.

9. One or more computer-readable hardware storage media as recited in claim 6, wherein the certificate authority is further configured to sign the first portion and provide the digital certificate to a server after the first portion is signed.

10. One or more computer-readable hardware storage media as recited in claim 6, wherein the reserved spaces can be reserved for inclusion of an ID associated with a client device.

11. One or more computer-readable hardware storage media as recited in claim 6, wherein the certificate authority is further configured to sign the first portion of the digital certificate, wherein the second portion is unsigned, wherein the first portion includes a public key of an associated extended data signing key pair that is usable to verify the extended data that is to be added into the second portion.

12. One or more computer-readable hardware storage media as recited in claim 6, wherein the certificate authority is further configured to sign the first portion of the digital certificate, wherein the single digital certificate is not generated responsive to a client request being received, wherein the second portion is unsigned.

13. One or more computer-readable hardware storage media as recited in claim 6, wherein the reserved spaces are reserved for inclusion of extended data associated with a run time request.

14. One or more computer-readable hardware storage media comprising instructions that, when executed by a computing device, cause the computing device to:
   responsive to a client request to add extended data to a digital certificate, add the extended data to an unsigned portion of the digital certificate that includes reserved empty spaces that are reserved for the extended data, the digital certificate having a signed portion that is signed by an entity that generated the digital certificate, the extended data including a client ID associated with a client device that formed the client request; and subsequent to the extended data being added to the unsigned portion of the digital certificate, sign the unsigned portion of the digital certificate.

15. One or more computer-readable hardware storage media as recited in claim 14, wherein the digital certificate includes, in the signed portion, a public key associated with a private key that is utilized to sign the unsigned portion.

16. One or more computer-readable hardware storage media as recited in claim 14, wherein the instructions, when executed by the computing device, further cause the computing device to transmit the digital certificate to the client device that formed the client request.

17. One or more computer-readable hardware storage media as recited in claim 14, wherein the unsigned portion of the digital certificate is signable without having a key used to sign the first portion being available.

18. One or more computer-readable hardware storage media as recited in claim 14, wherein the client request includes the extended data that is to be added to the digital certificate.

19. One or more computer-readable hardware storage media as recited in claim 14, wherein the entity that generated the digital certificate having the signed portion and the unsigned portion, and signed the signed portion comprises a certificate authority.

20. One or more computer-readable hardware storage media as recited in claim 14, wherein the unsigned portion of the digital certificate is signed using a private key of an associated extended data signing key pair.

* * * * *